Nov. 29, 1960 M. K. MAYNARD 2,961,766
UTENSIL
Filed Oct. 3, 1958
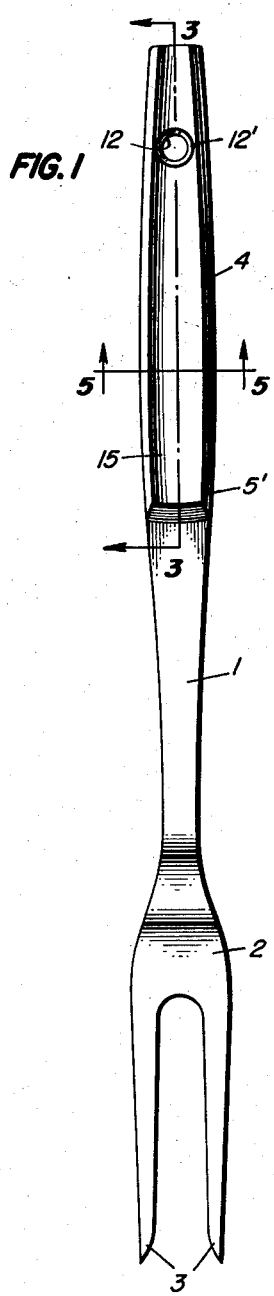
FIG. 1
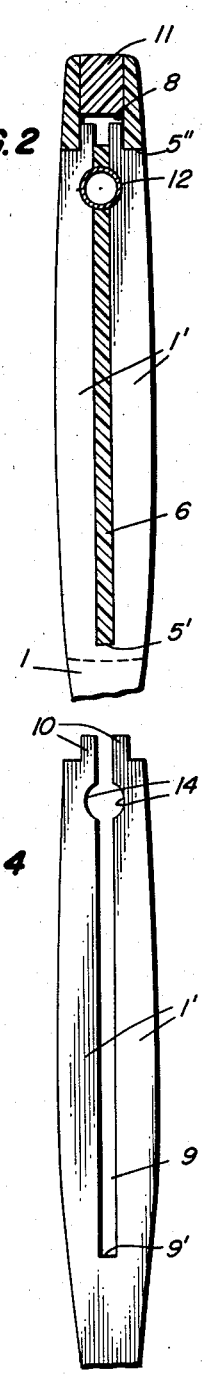
FIG. 2
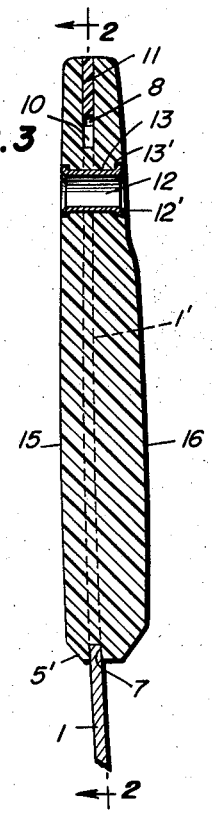
FIG. 3
FIG. 4
FIG. 5
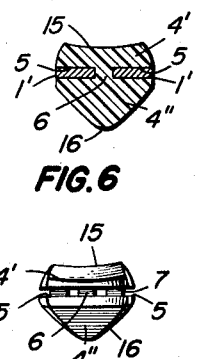
FIG. 6
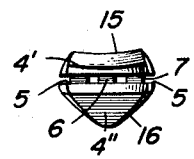
INVENTOR
Mark K. Maynard
ATTORNEY

United States Patent Office 2,961,766
Patented Nov. 29, 1960

2,961,766
UTENSIL

Mark K. Maynard, 1444 E. Colorado Blvd., Glendale, Calif.

Filed Oct. 3, 1958, Ser. No. 765,102

2 Claims. (Cl. 30—342)

This invention relates to utensils, and more particularly to improved utensils, such as are generally known as kitchenware implements or tools, provided with stronger and more durable handles having hand grips which facilitate holding and handling of the utensils.

In utensils of the kitchenware type, it is very desirable that the hand grip portion of the handle should be made of a heat insulating material and that it be very securely anchored to the utensil. Furthermore, it is desirable that the handgrip portion of the handle should be convenient for the user to hold and to maintain a firm grip theron. These features all are important as they increase the safe use and the ultimate life of the utensils.

An object of this invention is to provide a new and improved utensil, of the kitchenware type, with a handgrip which is securely anchored to the utensil.

Another object of this invention is to provide an improved kitchen utensil having a handle with improved contours and a secure connection to the utensil.

A further object of this invention is to provide an improved handgriup for a kitchen utensil handle.

Further objects and advantages of this invention will become apparent from the following description referring to the accompanying drawing, and the features of novelty which characterize this invention will be pointed out with particularity in the claims appended to and forming a part of this specification.

In the drawing:

Fig. 1 is a plan view illustrating the front face of a kitchen utensil made in accordance with this invention;

Fig. 2 is a sectional view along line 2—2 of Fig. 3 illustrating the structure and relative arrangement of the cooperating handgrip and handle elements;

Fig. 3 is a sectional view taken along line 3—3 of Fig. 1 illustrating the relative arrangement and structure of the handgrip and handle substantially at right angles to the view shown in Fig. 2;

Fig. 4 is a plan view of the outer end of the utensil handle shank removed from the handgrip;

Fig. 5 is a sectional view along line 5—5 of Fig. 1 showing the relative arrangement of the cooperating parts of the utensil handle and handgrip and also the details of the contours of the handgrip surfaces; and Fig. 6 is an end view of the handgrip adjacent to the implement portion of the utensil, with the implement handle shank removed from the handgrip.

Referring to the drawing, an embodiment of an improved utensil of the kitchenware type, made in accordance with this invention, is shown in Fig. 1 in the form of a fork. This fork is provided with a handle having a shank 1 and a body portion 2 formed with prongs 3 having a food carrying front face and a rear or back face. In the improved handle for this utensil a handgrip 4 is provided which preferably is made of molded heat insulating plastic material, securely anchored to the handle shank 1. Maximum strength is provided to the handle of the utensil by forming the implement body 2 and the handle shank 1 of a single piece of metal and extending the metal handle shank through substantially the full length of the handgrip. In addition, the handgrip 4 and the metal implement handle shank 1 are formed of particular configurations and cooperating portions to provide a plurality of tight-fitting engaging parts.

The handgrip may conveniently be molded into the desired configuration as a unitary member with a number of communicating slots, grooves, sockets, and apertures adapted to receive cooperating handle shank portions for securely anchoring the handgrip to the shank. This handgrip configuration includes a longitudinally extending slot 5 along both sides extending from the end 5' of the handgrip nearer the implement body 2 to a predetermined point 5" short of the outer end of the hand grip. These slots form a pair of spaced front and back handgrip portions 4' and 4", respectively, which are connected longitudinally along the inner side thereof by a relatively narrow bridge 6. This bridge 6 extends from the inner end 5' of the slots 5 to slightly beyond the outer ends 5" of these slots adjacent to the outer end of the handgrip. Another slot 7 is formed across the inner implement end of the handgrip in the form of a shallow slot extending transversely of the handgrip and of substantially the same width or thickness as the longitudinal slots 5 and joins the adjacent ends of these longitudinal slots across inner end of the bridge 6. The outer ends of the two longitudinally extending slots 5 terminate in a socket 8 formed in the outer end of the hand grip. This socket is of lesser transverse width than the width of the handle and is of the same depth or thickness as the longitudinally extending slots 5. The various slots and the socket 8 in the handgrip are adapted to receive parts of the utensil handle shank 1 with a snug fit so as to eliminate all relative movement therebetween, and are, therefore, made to substantially the same dimensions as the cooperating handle shank elements.

The cooperating handle shank elements comprise two parallel parts 1' which are of substantially the same thickness as the handgrip slots 5 and are formed by a longitudinally extending slot 9 which bifurcates the outer portion of the handle shank 1. This bifurcating slot is the same width as the handgrip bridge 6 and the handle parts 1' are adapted to be pressed into the slots 5 so as to provide a tight pressed fit therein with the inner edges thereof, along the bifurcating slot 9, in tightly pressed clamping engagement with the outer sides of the handgrip bridge 6.

In order further to assure against relative movement between the handgrip and the implement handle, the outer ends of the handle shank parts 1' are formed with short tangs 10, which extend longitudinally from each end thereof and are separated by a continuation of the bifurcating slot 9. The width or dimension of the tangs between the outer sides thereof is less than the width of the adjacent ends of the handle parts 1' and is just very slightly greater than the width of the socket 8 in the handgrip. In assembling the handgrip on the utensil handle shank, pressure is applied longitudinally thereof and the tangs 10 are pressed into the socket 8 until the shoulders at the ends of the parts 1' of the handle shank engage the outer ends 5" of the slots 5 and the inner end 9' of the slot 9 engages the end of the bridge 6 within the transversely extending slot 7. In this manner, the tangs 10 securely clamp the inner edges of the handle shank parts 1' into engagement with the outer sides of the handgrip bridge 6 and firmly lock these parts of the utensil handle in position within the handgrip. The extension of the handle shank 1 into the transversely extending slot 7 further reinforces the handle and seals the slot 9, thus assuring against the entrance of foreign matter and providing for ease in maintaining the cleanliness of this portion of the utensil. The outer end of the socket 8 is conveniently closed by a sealing plug 11, In order securely to lock the handgrip and the handle shank in assembled relationship, and in order to provide a convenient means for hanging the tool when not in use, a hollow rivet 12 is mounted in the handgrip in a transversely extending hole or bore 13 and extends through arcuate notches 14 on the inner edges of the handle shank parts 1', along the sides of the slot 9. This hollow rivet 12 preferably extends through the handle adjacent to the outer end thereof and is secured in position by having its outer ends 12' peened or spun over into countersunk bores 13' at the outer edges of the hole 13. In this manner the rivet 12 extends transversely through the front and back faces of the handgrip and through the handle shank substantially perpendicularly to the flat faces thereof, in tight locking engagement with the handgrip and the complementary notches 14, so as to lock the shank and the handgrip securely in assembled relation. The rivet 12 conveniently is of greater diameter than the width of the slot 9 so as to assure against longitudinal displacement of the handle 1 from the handgrip 4 without imposing upon the rivet the stress which is normally imposed upon rivets when used for securing handgrips to handles, such stress being evenly distributed throughout the length of the handgrip by engagement of the edges of the handle shank along the slot 9 with the handgrip bridge 6. Furthermore, the snug fit of all of the utensil handle parts within the various slots of the handgrip assures an even distribution of stress throughout the handgrip, and provides for a longer useful life of the utensil.

In order further to provide for ease in handling the utensil, the handgrip is formed with a front face 15 which is concave transversely of the handle, and with a back face 16 which is generally convex transversely of the handle. This provides guiding surfaces for easily and properly gripping the handle, as the cavity of the front face forms a convenient seat for a user's thumb, and the generally convex contours of the back face of the handle provide for the easy folding of a user's fingers around the back of the handgrip. All of the outer surfaces of the portions of the handle shank in the handgrip are finished to the same dimensions as the handgrip, so as to provide continuous smooth surfaces around the exterior of the handle, thereby further enhancing the ease of manipulation of the utensil and providing against the entrance of foreign matter between the handgrip and the cooperating parts of the handle shank, and assuring continued cleanliness throughout the life of the utensil.

While a partciular embodiment of this invention has been illustrated and described, modifications thereof will occur to those skilled in the art. It is to be understood, therefore, that this invention is not to be limited to the particular arrangement and structure disclosed, and it is intended in the appended claims to cover all modifications within the spirit and scope of this invention.

I claim:

1. A kitchen utensil comprising an implement having a front face and a back face and a handle, said handle including a handgrip having a longitudinally extending slot along both sides thereof extending from the end of said handgrip nearer said implement to a predetermined point short of the outer end of said handgrip and forming a pair of spaced handgrip portions connected longitudinally along the inner sides thereof by a relatively narorw bridge, said handgrip having a socket in said outer end thereof joining the adjacent outer ends of said longitudinal slots, said handle also including a longitudinally extending metal shank having a slot extending longitudinally substantially centrally thereof having a width substantially equal to the width of said bridge in said handgrip and bifurcating said shank into two parts, a short tang extending longitudinally from the end of each of said shank parts, said shank having a pressed fiit in said handgrip with said two shank parts in snugly fitted engagement within said slots in the sides of said handgrip and said tangs in inwardly pressed clamped fit in said socket whereby said shank parts tightly grip said handgrip bridge substantially the full length of said handle, said shank extending into said handgrip to a position wherein the end of said bifurcating slot nearer said implement abuts the adjacent end of said handgrip bridge, and means including a rivet of a diameter greater than the width of said bifurcating slot extending transversely through the front and back faces of said handgrip and through said shank in tight locking engagement with said handgrip and shank for locking said shank and handgrip in assembled relation.

2. A kitchen utensil comprising an implement having a front face and a back face and a handle, said handle including a handgrip of molded heat insulating plastic material having a longitudinally extending slot along both sides thereof extending from the end of said handgrip nearer said implement to a predetermined point short of the outer end of said handgrip and forming a pair of spaced handgrip portions connected longitudinally along the inner sides thereof by a relatively narrow bridge extending slightly beyond the outer ends of said slots toward the outer end of said handgrip, said handgrip having a shallow transversely extending slot across the implement end thereof joining the adjacent ends of said longitudinal slots and across said bridge of substantially the same width as said longitudinal slots, said handgrip having a socket in said outer end thereof joining the adjacent outer ends of said longitudinal slots, said handle also including a longitudinally extending metal shank integrally connected to said implement and formed of a thickness substantially equal to the width of said slots in the sides of said handgrip for providing a tight fit therein, said shank having a slot extending longitudinally substantially centrally thereof having a width substantially equal to the width of said bridge in said handgrip and bifurcating said shank into two parts with an unbifurcated portion adjacent to said implement, a short tang extending longitudinally from the end of each of said shank parts separated by a continuation of said bifurcating slot and having a width from the outer sides thereof less than the width of said shank and slightly greater than the width of said socket in said handgrip, said shank having a pressed fit in said handgrip with said two shank parts in snugly fitted engagement within said slots in the sides of said handgrip and said tangs in inwardly pressed clamped fit in said socket whereby said shank parts tightly grip said handgrip bridge substantially the full length of said handle, said shank extending into said handgrip to a position wherein the end of said bifurcating slot nearer said implement abuts the adjacent end of said handgrip bridge and said unbifurcated portion of said shank extends into said shallow transversely extending handgrip slot providing substantially continuous smooth handle surfaces, and means including a rivet of a diameter greater than the width of said bifurcating slot extending transversely through said handgrip and shank in tight locking engagement with said handgrip and complementary notches in the shank edges of said bifurcating slot for locking said shank and handgrip in assembled relation.

References Cited in the file of this patent

UNITED STATES PATENTS

| | | |
|---|---|---|
| 1,998,044 | Brown | Apr. 16, 1935 |
| 2,375,751 | Champlin et al. | May 15, 1945 |
| 2,382,304 | Foltz et al. | Aug. 14, 1945 |
| 2,671,668 | Krause et al. | Mar. 9, 1954 |
| 2,695,450 | Platts | Nov. 30, 1954 |

FOREIGN PATENTS

| | | |
|---|---|---|
| 1,868 | Great Britain | A.D. 1888 |
| 7,347 | Great Britain | Apr. 9, 1901 |
| 516,227 | Germany | Jan. 20, 1931 |
| 769,621 | France | June 11, 1934 |